(No Model.) 2 Sheets—Sheet 2.

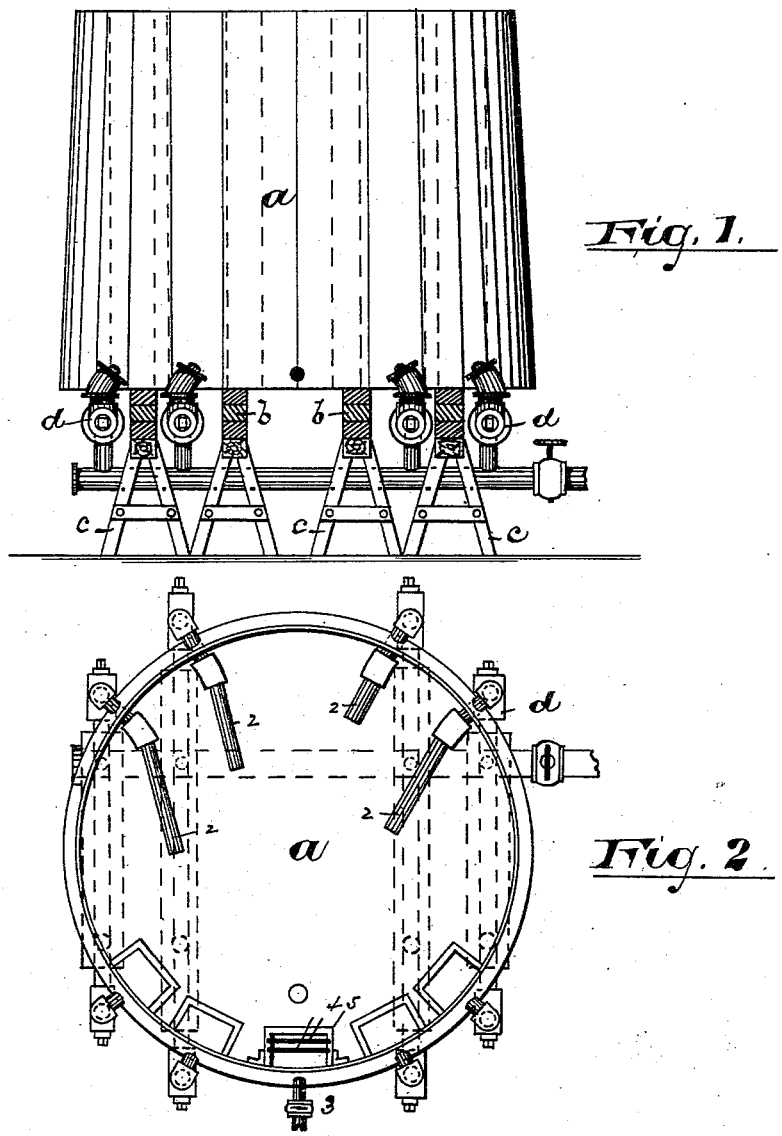

T. P. MILLIGAN.
APPARATUS FOR DISSOLVING GLUE STOCK.

No. 420,163. Patented Jan. 28, 1890.

WITNESSES: INVENTOR
Alfred Gartner
E. L. Sherman

Thomas P. Milligan,
BY [signature] ATTY'S.

UNITED STATES PATENT OFFICE.

THOMAS P. MILLIGAN, OF SOUTH ORANGE, NEW JERSEY.

APPARATUS FOR DISSOLVING GLUE-STOCK.

SPECIFICATION forming part of Letters Patent No. 420,163, dated January 28, 1890.

Application filed February 4, 1889. Serial No. 298,569. (No model.)

*To all whom it may concern:*

Be it known that I, THOMAS P. MILLIGAN, a citizen of the United States, residing at South Orange, in the county of Essex and State of New Jersey, have invented certain new and useful Improvements in Apparatus for Digesting, Dissolving, or Reducing Glue-Stock, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The more particular object of this invention is the reduction of prepared glue-stock, tanner's scraps, hide pieces, bones, and other animal tissues to a gelatine solution—a quality much superior to that now or heretofore in general use because of its not being injured by the heat employed in the process.

Heretofore in the reduction of glue-stock the steam pipes or coils employed in heating the water enveloping the stock to be dissolved or reduced by boiling were arranged within the tank containing the water and stock and were thus brought into intimate contact with the solution, imparting to the stock and solution nearest the pipes an intense heat. As a result, the gelatinous compound was scorched or disorganized in a measure, or the elements were so changed under the action of the heat as that the solution, and afterward the jelly resulting from the reducing operation, was deprived to some extent of its setting quality, elasticity, and strength and given a color which lacked in clearness and purity, and thus seriously detracted its quality. As a result of the improved device and process, the gelatine solution and jelly are of a more uniform color and strength, the color is of a greater purity and free from the effects of burning, and the quantity of jelly from a given amount of stock is largely increased.

The invention consists in the improved apparatus for reducing the glue-stock to a liquid solution, substantially as will be hereinafter set forth, and finally embodied in the clauses of the claim.

Figure 3:
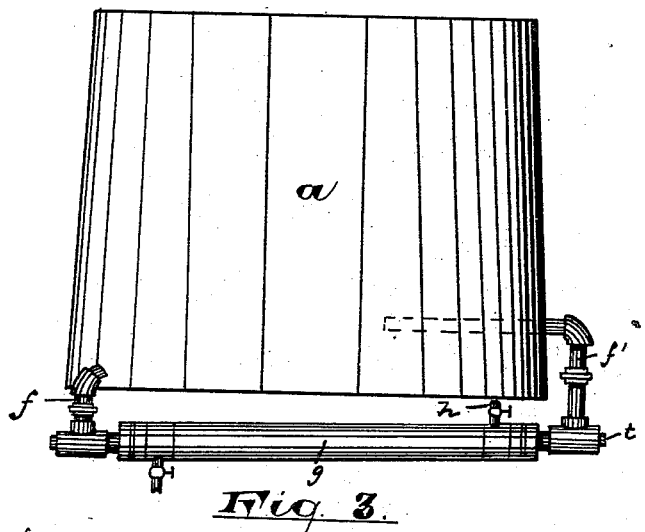
Figure 4:
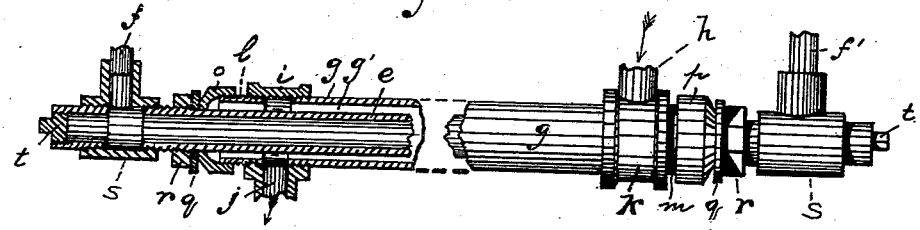
Figure 5:
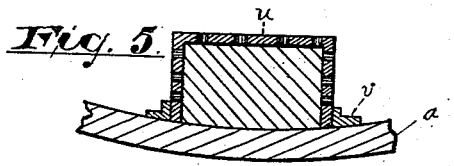
Figure 6:
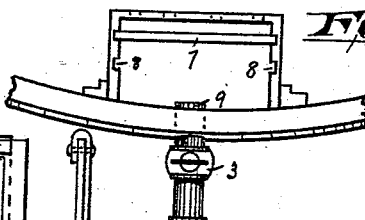
Figure 7:
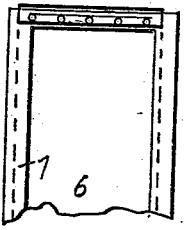
Figure 8:

Referring to the accompanying drawings, embraced in two sheets, in which like letters of reference indicate corresponding parts in each of the several figures, Figure 1, Sheet 1, is a front elevation of the improved device. Fig. 2 is a plan of the same. Fig. 3, Sheet 2, is a side elevation of the device devoid of the supports for the tanks. Fig. 4 is a detail view of a heater employed with the tank outside of the same. Fig. 5 is a sectional detail illustrating the construction of certain filters. Fig. 6 illustrates in detail the means employed for drawing off the liquid solution. Fig. 7 is a detail elevation of a straining-diaphragm for clearing the liquid before drawing, and Fig. 8 is an edge view of the same.

In said drawings, $a$ indicates a tank of any construction suited for the liquids, the same being preferably made of wood. Said tank is or may be supported in a raised position by beams $b\ b$, carried by standards $c$, or by any other proper support. Below said tank or receptacle is arranged a series of heaters $d\ d$, which, when steam is employed as the heating medium, consists of jacketed pipes, substantially such as are illustrated in Fig. 4. While this arrangement (shown in Fig. 4) is preferred, other means may be employed without departing from the invention.

Of the preferred construction, $e$ indicates a heating-pipe of, say, an inch and one-half in diameter and about six feet in length. This is connected at its opposite end by means of suitable branch pipes or couplings $f f'$ with the lower part of the tank. The inlet branch $f$, by which the heating-pipe is supplied with liquid to be heated, receives the liquid from a low point in the tank, and the outlet-pipe, through which the heated liquid is conveyed back to the tank, enters said tank at a higher point therein, as will be apparent upon reference to Fig. 3. The branches and heating-pipes are connected by any of the well-known couplings or pipe-connections. Around said heating-pipe is arranged a larger pipe or jacket $g$, of about five feet in length and two and one-half inches in diameter. A chamber $g'$ is thus formed between the two pipes, into which steam may be introduced from an exhaust or live steam pipes $h$. In lieu of steam hot water may be employed as the heating medium. The heat of the steam is absorbed by the liquid passing through the heating-pipe, and the latter is caused to circulate or is given a movement in said pipe because of the heating, the movement being in the direction of the highest connection with the tank for reasons well understood. The circulation of the water through the tank and heating-pipe soon raises the body of water to the desired temperature for dissolving, disintegrating, or reducing the stock.

On one side of the jacket I screw an ordinary T-connection $i$, which provides an outlet $j$ for the steam or water of condensation after having effected its object in connection with the heating-pipe $e$. At the other end of the said heating-pipe is secured a similar T-connection $k$, to which is joined the steam-supply pipe $h$ above referred to. Into the outer ends of the said T-connections are screwed short nipples $l\,m$, and to said nipples reducers $o\,p$, which engage or nearly engage the periphery of the projecting heating-pipe. An impervious joint is made between said reducer and heating-pipe by packing-washers $q\,q$, of rubber or other suitable material, and the heating-pipe, jacket, and connections are held in fixed relative position by nuts $r\,r$, which are screwed on the threaded ends of the heating-pipe and bear against and force the packing close to the reducer, and thus close the steam-chamber and prevent the escape of steam. Upon the extremities of the steam-pipe are secured T-connections $s\,s$, which receive the inlet and outlet branches $f\,f$, connecting with the tank. The outer extremities of the said T-connections are suitably plugged, as at $t\,t$, the plugs being removable to allow access to the interior of the pipe $e$ for purposes of cleaning or other purposes.

The heater is preferably arranged on an incline, as shown in Fig. 3, to facilitate circulation, the inlet or cooler end of the pipe being the lower and the outlet end, connected with the pipe $f'$, the higher.

To secure a liquid free or practically free of undissolved matter, such as would tend to settle on the bottom of the heating-pipes and burn and thus discolor the fluid in its passage through the heating-tube $e$, I provide the tank with a filter at the inlet end of the heater. This preferably consists of a box or boxes $u\,u$, Figs. 2 and 5, secured against the side of the tank, substantially as shown in Fig. 5, by cleats $v$ or in any other suitable manner. The walls of said box or boxes are perforated to allow an inflow of liquid, and the interior is filled with excelsior or with any other suitable filtering material adapted to prevent the passage of undissolved matter into the heating-pipes and settling therein, and thus being burned or otherwise so affected as to render it unsuited to be reduced to glue or sizing of a good quality. The exit-pipes for the heated water extend variously into the tank $a$, as indicated in Fig. 2 at 2 2, so that the hot water is more thoroughly mixed with the cooler water of the tank, as it would not be so readily did the outlet or exit pipes terminate at the sides of the tank, as will be understood.

The passage to the draw-off cock or valve 3, through which the solution is drawn off when brought to a proper consistency, is also protected by a filter, preferably a sliding screen 4. This said screen may and preferably does consist of a burlap cloth 6, Fig. 7, stretched over a frame 7, of wood or any other material. Said frame slides in grooves 8, Fig. 6, formed at the sides of a vertical box 5, Figs. 2 and 6, which is perforated or otherwise open to allow access of the solution to the screen, and into which box the valved pipe 9 opens to receive the screened solution.

The nipples and reducers shown may be dispensed with and a T-connection reduced at one end may be employed as an equivalent. While I prefer to employ my device in the manufacture of glue, jelly, or other gelatinous matter, it may be employed in other branches of art, and various changes of construction may be made without departing from the spirit and scope of my invention.

In manufacturing gelatinous products in accordance with my improvements, I first introduce the stock and water to the tank and turn on the steam or heating medium. A circulation is at once instituted and the body of water gradually heated; but no part of the water having undissolved or undigested matter therein is overheated and the latter burned or otherwise disorganized. The water gravitates, after having been filtered, into the heating-pipe outside of the tank and there absorbs the heat of the steam or other heating medium, expands and thus rises in the direction of least resistance, thus producing a circulation which continues until the water takes up the proper quota of gelatine, when the solution is drawn off, passing through screen and thus being strained and freed from undigested matter. After this another quantity of water is added to the stock yet remaining in the tank and the operation above described repeated. Generally four drawings are sufficient to exhaust the stock first introduced, and by my improvements the last drawing is of about the same color and strength as of the first, there being no waste caused by overheating and discoloration produced by burning and the presence of undissolved or undigested particles.

The medium by which the water or fluid containing or enveloping the matter to be dissolved or digested or reduced to a solution by other than direct fire is preferably steam, but hot water may be employed in connection with the reduction of certain grades of stock. In the use of steam or water the degree of heat may be perfectly controlled without the exercise of peculiar skill, and may be turned off or on instantaneously, at will.

I am aware that heretofore in a certain kind or class of wash-boilers the wash-water has been conducted from the tank or tub to and around the outside of a furnace placed at the side of the said tank or boiler where said water will receive the heat radiated outwardly from said furnace.

Having thus described the invention, what I claim as new is—

1. The improved apparatus for reducing glue-stock, &c., combining therein a tank, a glue-solution conduit or pipe connected with the said tank at opposite ends to circulate the solution through the tank and said conduit or pipe, a jacket arranged on the outside of said pipe and forming a chamber therearound, and conduits or pipes for conducting the heating medium into said chamber, substantially as and for the purposes set forth.

2. The improved glue-stock digester or reducer herein described, combining with a suitable tank or receptacle for glue-stock a pipe or conduit connecting with the said tank at its opposite ends at varying levels to secure a circulation of liquid, a jacket surrounding said pipe or conduit and forming a chamber therearound, and a duct or pipe opening into said chamber and supplying the same with the heat medium, substantially as and for the purposes set forth.

3. In combination, a tank or receptacle $a$, a pipe $e$, connected at its opposite ends with said tank, a jacket $g$, forming with said pipe a chamber $g'$, pipe $h$, for introducing steam or hot water to said chamber, and an outlet-pipe $j$, substantially as set forth.

4. In combination, the tank, jacketed conduits or pipes arranged outside of but in communication with said tank, and pipes for conveying or conducting the heating medium to the chamber around said jacketed pipe, and a filter arranged in said tank to clarify the liquid before it is allowed to pass into the jacketed pipe or conduit, a draw-off cock or valve, and a screen or filter to prevent the passage of undigested matter, substantially as and for the purposes set forth.

5. In combination with the tank having a draw-off cock and a heater consisting of a jacketed conduit or pipe connecting at its opposite ends with the tank at varying levels, the openings into said tank being protected by boxes perforated as described, and provided with fibrous matter, substantially as described.

In testimony that I claim the foregoing I have hereunto set my hand this 29th day of January, 1889.

THOS. P. MILLIGAN.

Witnesses:
CHARLES H. PELL,
E. L. SHERMAN.